Figure 1:
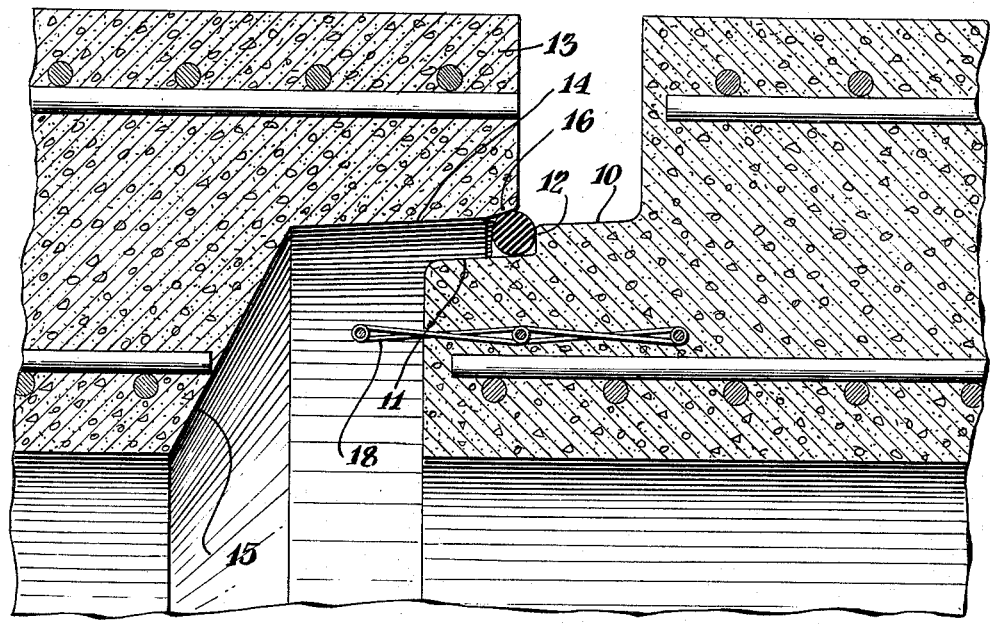

Dec. 3, 1940.  W. W. TRICKEY  2,223,434
PIPE JOINT
Filed June 3, 1939

INVENTOR
William W. Trickey
BY
Cooper, Kerr & Dunham
ATTORNEYS

Patented Dec. 3, 1940

2,223,434

UNITED STATES PATENT OFFICE 2,223,434

PIPE JOINT

William W. Trickey, Verona, N. J., assignor to Lock Joint Pipe Company, East Orange, N. J., a corporation of New Jersey Application June 3, 1939, Serial No. 277,230

3 Claims. (Cl. 285—112)

This invention relates to concrete pipes, and particularly to pipe joints therefor which are suitable for the employment of rubber as a sealing medium. Among the objects of the invention is to provide a form of pipe joint which has the advantage that it is adaptable particularly to concrete pipe of large diameter and which remains secure against leakage notwithstanding such axial displacement of connected pipes as might occur from settling after laying.

Another object of the invention is to provide for relatively heavy pipe a pipe joint employing rubber as a sealing medium which can be constructed within economical cost limits and nevertheless provide all those qualities of a joint required to insure the joint against leakage from failure of the sealing medium.

There have been numerous suggestions for the formation of joints capable of utilizing rubber as a sealing gasket, but many of these have been more concerned with the manner in which the rubber is to be applied or held in place without sufficient regard having been given to the necessity of preserving the sealing properties of the rubber for use over a prolonged period of time. In some of these constructions and in others in which the necessity of encasing the rubber has received attention, the all important matter of cost economy has not been a factor in the determination of the design. The larger the pipe the more important it becomes that consideration be given the cost of manufacturing and assembling the joints of pipes.

In addition to correctly placing a rubber gasket, it is necessary that care be taken to insure that the gasket is completely encased and that it will remain encased even though the joined ends of pipe sections become displaced or moved axially from each other after the laying of the pipe and closing of the joint. Secure encasement preserves the rubber. If well confined after placement the sealing quality of the deformed rubber will continue to be unaffected because of its inability to change its shape owing to the restraint thereon provided by non-variable encasing walls. In order to make certain that the rubber gasket is not permitted to expand or shift, either immediately after the closing of the joint, or as the result of relative axial separation of the jointed pipe sections, I so construct the pipe sections that the axial dimension of the rubber gasket is always maintained. This is accomplished by providing a shoulder substantially lateral to the axis of the pipe which backs up one side of the rubber gasket and at the same time so forms the pipe section as to enable the other side of the rubber gasket to be completely backed up by a mortar filling. The shoulder and the mortar filling constitute walls at opposite sides of the rubber gasket which determine once and for all the maximum axial dimension of the rubber gasket. The wall produced by the mortar filling is held indisplaceable by its bond to adjoining pipe surfaces and by means of an element which ties together the mortar filling and the pipe section carrying the transverse wall which backs up the rubber gasket.

Figure 2:
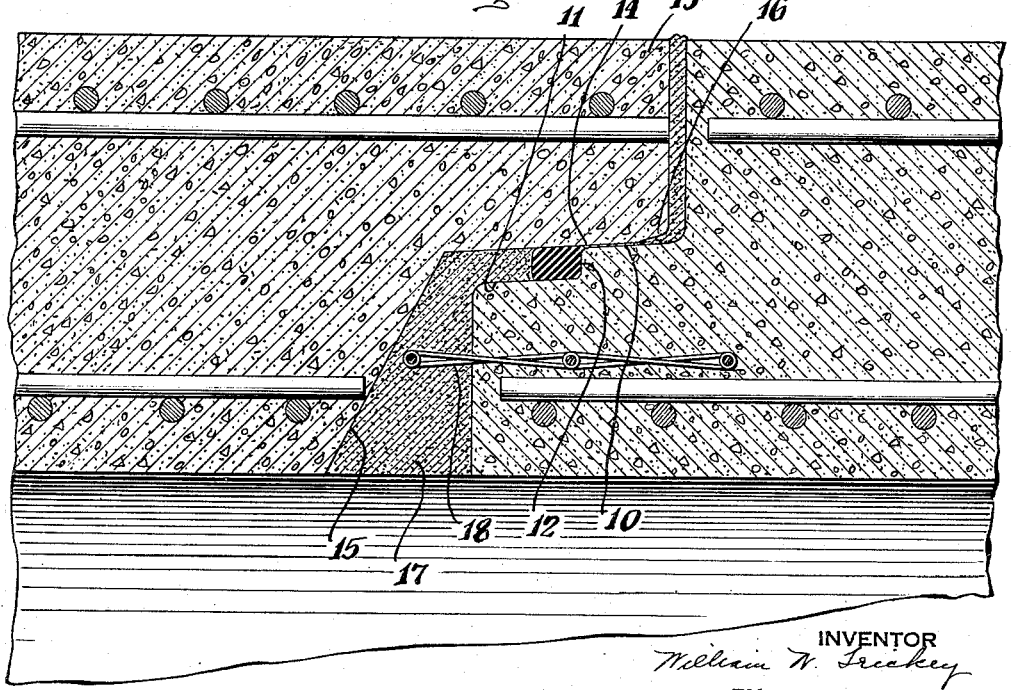

Referring to the drawing, Fig. 1 shows the ends of pipe sections which are to be joined, and Fig. 2 shows a detail of the joint when closed.

The pipe sections are preferably made from concrete or from reinforced concrete. The improvement is particularly applicable to joints having opposing concrete surfaces where the joint is sealed. The spigot end of the pipe is shown as having two stepped diameters providing a bearing surface 10 and a surface of less diameter 11. These two surfaces are separated by a shoulder 12 which extends transverse the axis of the pipe and serves as a backing wall for the gasket when the joint is being assembled and after completion. The other end of the pipe is called the bell end. The drawing shows the spigot of one pipe section and the bell of a second pipe section.

The bell consists of a portion 13 of the pipe wall extending beyond the inside surface of the pipe section. The bell has an inner bearing surface 14. The seat of the bell is a surface 15. In the practice of my invention, the longitudinal dimension of the space extending from the seat of the bell to the end of the bell must exceed the aggregate length of the bearing surface 10 and the reduced or gasket surface 11 of the spigot for reasons which will be explained hereinafter. The relationship of these two dimensions is generally illustrated in the assembled joint shown in Fig. 2.

Surfaces 10 and 11 of the spigot and surface 14 of the bell are concentric. They are usually slightly tapered though under some conditions they may be cylindrical. The outer surface 10 of the spigot and the inner surface 14 of the bell are the bearing surfaces between the joined pipe ends. They center the connected ends and consequently provide uniformity of space for the gasket entirely around the joint, so that there is uniformity of deformation and hence of the sealing quality of the gasket throughout its circumference.

While the spigot and bell ends of pipe sections to be joined may be united before the sealing gasket is placed about the spigot surface 11, I prefer to mount the sealing gasket upon the end of the spigot, as illustrated in Fig. 1, before the spigot and bell are joined. The gasket consists of a band of rubber, or of other material having like sealing properties, whose inner circumference is sufficiently less than that of the gasket surface 11 for the gasket to remain in place because of its tension. While other cross-sectional shapes may be used, I preferably employ a band of rubber having a circular cross-section. The sealing capability of the rubber is determined by the thickness and form of the band before its deformation. When the spigot, with the gasket mounted thereon, is introduced within the bell, the bearing surface 14 of the bell will change the cross-section of the rubber from its original circular form to one having flattened surfaces bearing on the one hand against the surface 11 of the spigot and on the other hand against the bearing surface 14 of the bell.

The sealing effectiveness of the rubber is determined by the amount of distortion or deformation which occurs when the bell and spigot are joined. The greater the amount of reduction of the gasket laterally to the pipe, the greater will be the inherent tendency of the rubber to resume its undeformed or normal shape and the greater will be the sealing effect against the opposite faces 11 and 14. Solid rubber is relatively incompressible and one advantage of the present joint is that the confining space for the rubber between the spigot and bell is not limited in a longitudinal direction when the gasket is being compressed transversely, so that the manufacturing variations in the cross-sectional area of the gasket will not adversely affect the sealing qualities of the joint. For example, a gasket having a greater cross-section, will occupy more of the annular gasket space longitudinally of the joint than will a gasket of lesser cross-sectional area though both sizes will provide adequate seals. This becomes a matter of considerable importance to the laying of pipe in the field and particularly to the laying of pipe some ten or fourteen feet in diameter. In order to facilitate the entry of the spigot into the bell, the end of the bell is preferably provided with a surface 16 having a greater taper than surface 14. The sloping surface thus provided serves to assist in centering the two pipe sections as well as to deform the gasket at the time union is made.

The ends of the two pipe sections are so formed as to provide an open space between the seat of the bell and the end of the spigot when the sections are united. This space affords opportunity for a workman to inspect the rubber gasket and to make certain that it is in proper position. When the gasket is properly placed, this space is filled with cementitious material, such as mortar, which is tamped in to fill the remaining portion of the annular gasket chamber between the outer reduced surface of the spigot and the bearing surface of the bell. In this way the rubber is solidly backed up and entirely encased. The application of fresh mortar to the bare concrete surfaces of the bell and spigot provides a bond between the mortar filling and pipe surfaces.

The mortar preferably fills the entire space at the end of the spigot. The mortar thus placed constitutes a key 17, which is well bonded to the bell and spigot throughout contacting surfaces. In placing the mortar an element 18 is embedded which ties the key to the spigot. The tying element extends from the spigot and may be made conveniently from wires or wire nettings which are placed in position when the pipe is cast.

In the event that there should be any drawing apart of the joined sections due to subsequent settling of the pipe, or for other reasons, the mortar key will be held in place against the end of the spigot and thereby serve to prevent axial displacement of the rubber gasket. Upon the happening of any separation of the joined sections, the mortar seal can be affected only along the seat 15 of the bell. The position of the rubber gasket with relation to surface 15 is such that it will not be exposed even though the joint opens along the surface 15. The portion of the key which extends into the packing recess will continue to back up the gasket. In view of this, any axial displacement or change in the rubber gasket will not occur and the seal provided by the pressure which the rubber exerts will remain secure. Because of the inaccessibility of the rubber gasket from the inside of the pipe, its encasement and therefore its permanent sealing quality, is practically assured.

While the bearing surfaces 10 and 14 of the spigot and bell will ordinarily be so close together as to leave no space for access to be had to the gasket from the outside of the pipe, it is contemplated that any space at the end of the collar 13 be filled or packed with mortar. This filling will insure a complete closing in of the gasket from access by air and other fluids from the outside.

What is claimed is:

1. A bell and spigot joint for concrete pipes, comprising a bell, a spigot having a stepped end defining surfaces of different radii separated by a substantially square shoulder, the larger of said surfaces forming a bearing portion for said bell, the smaller of said surfaces carrying a resilient gasket abutting against said shoulder for sealing relationship with said bell, said gasket having a normal radial dimension exceeding the distance between said bell and spigot in their assembled relationship, whereby when the parts are assembled the gasket will be distorted into close engagement with said bell, spigot and shoulder.

2. A bell and spigot joint for concrete pipes, comprising a bell, a spigot having a stepped end defining surfaces of different radii separated by a substantially square shoulder, the larger of said surfaces forming a bearing portion for said bell, the smaller of said surfaces carrying a resilient gasket abutting against said shoulder for sealing relationship with said bell and spaced from the end of said spigot, said gasket having a normal radial dimension exceeding the distance between said bell and spigot in their assembled relationship, whereby when the parts are assembled the gasket will be distorted into close engagement with said bell, spigot and shoulder, and cementitious material filling the space within said bell defined between said gasket and the end of said spigot.

3. A bell and spigot joint for concrete pipes, comprising a bell member and a spigot member, one of said members having a stepped portion defining substantially cylindrical surfaces of different radii separated by a substantially square shoulder, one of said surfaces forming a bearing portion between said bell and spigot members, the other of said surfaces carrying a resilient gasket abutting against said shoulder for sealing relationship with said bell and spigot members, said gasket having a normal radial dimension exceeding the distance between said bell and spigot members in their assembled relationship, whereby when the parts are assembled the gasket will be distorted into close engagement with said bell and spigot members and shoulder.

W. W. TRICKEY.